Aug. 29, 1933.  G. G. BATES  1,924,098
FRUIT GRADER AND CLEANER
Filed Jan. 30, 1932   2 Sheets-Sheet 1
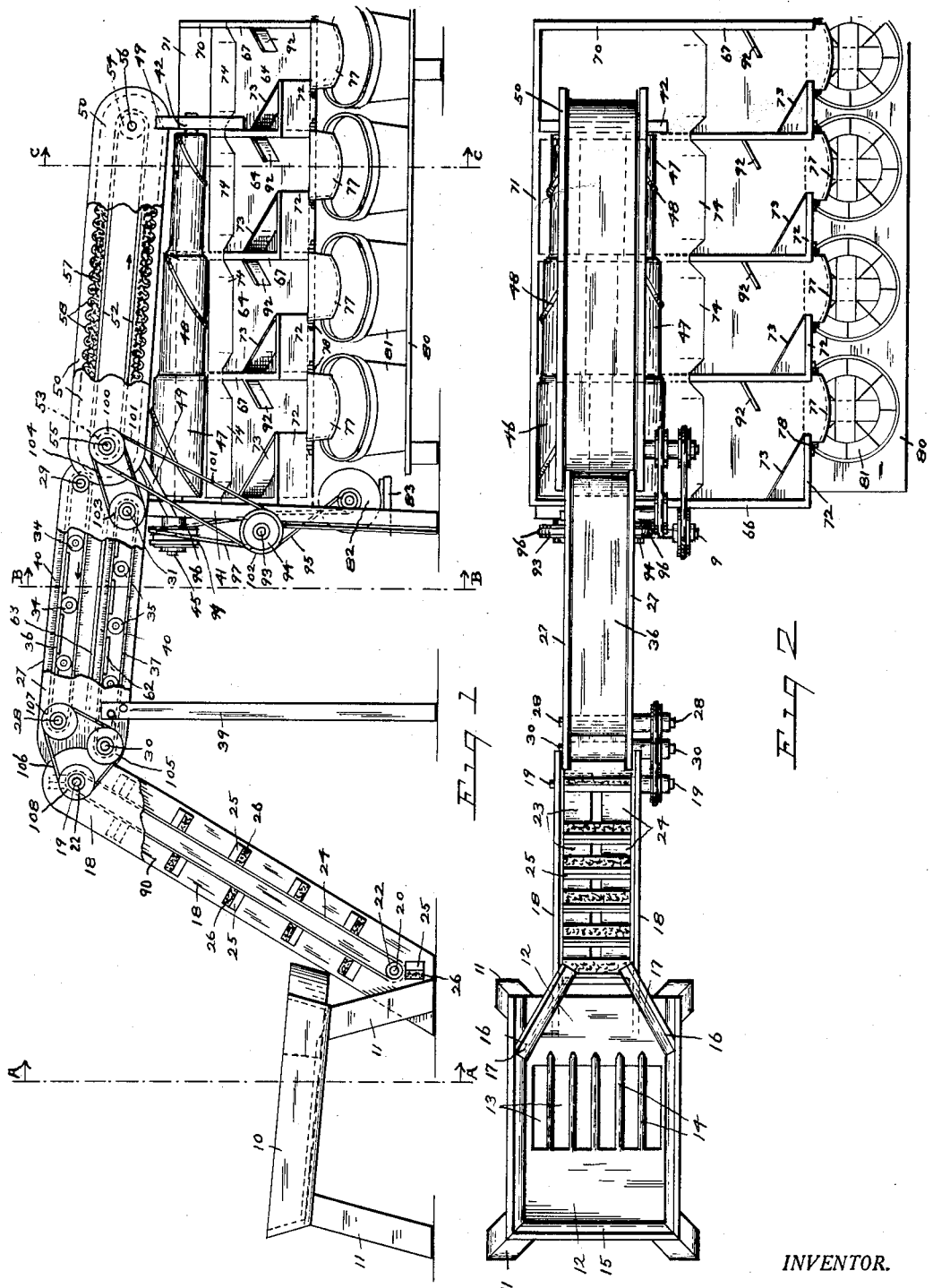
INVENTOR.
George G. Bates.
BY John J. Thompson
ATTORNEYS.

Aug. 29, 1933.  G. G. BATES  1,924,098
FRUIT GRADER AND CLEANER
Filed Jan. 30, 1932   2 Sheets-Sheet 2
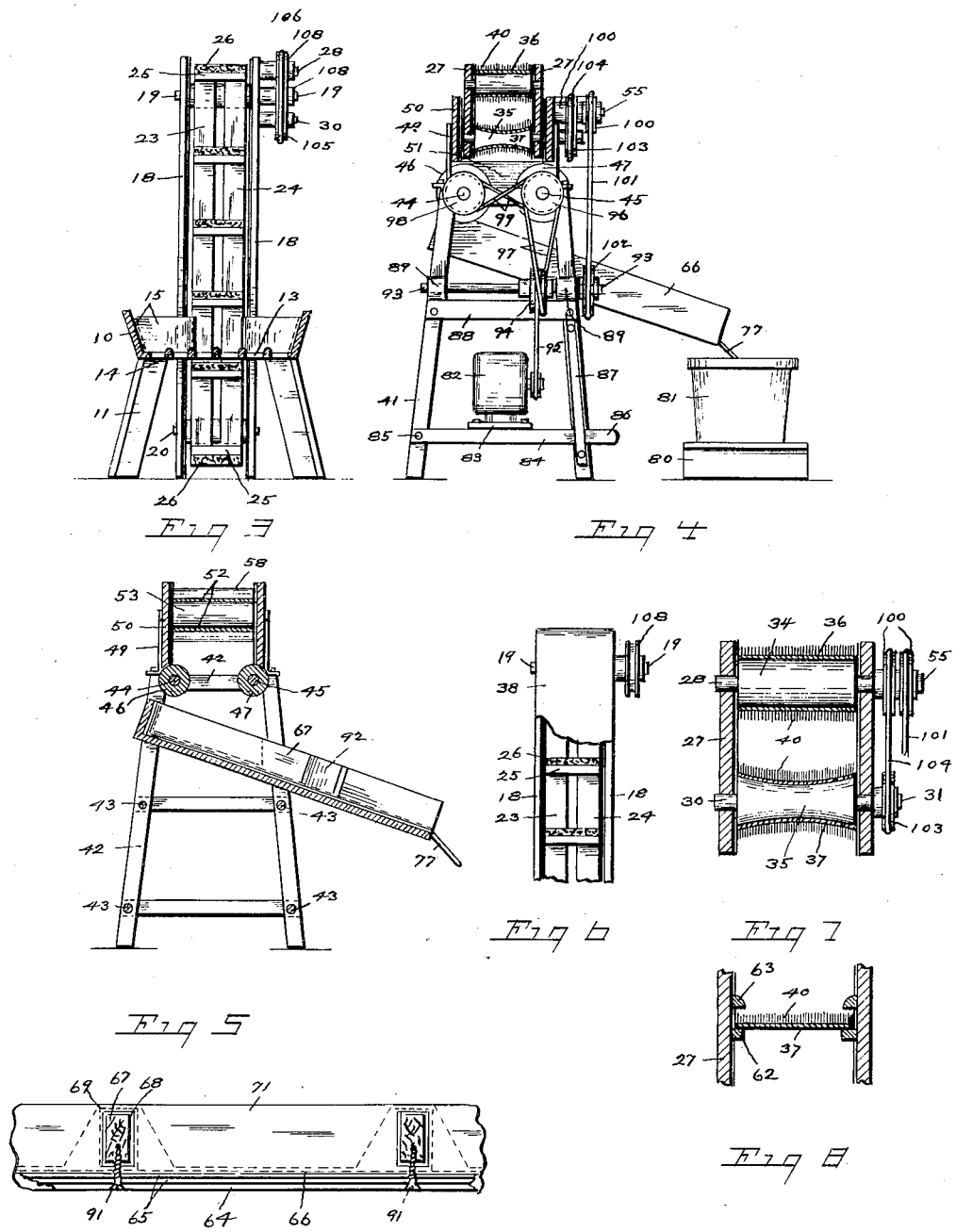

Patented Aug. 29, 1933

1,924,098

UNITED STATES PATENT OFFICE 1,924,098

FRUIT GRADER AND CLEANER

George G. Bates, Kingston, N. Y.

Application January 30, 1932. Serial No. 589,787

2 Claims. (Cl. 146—193)

This invention relates to a combined fruit grader and cleaner, and constitutes an improvement over the machine shown and described in United States Patent No. 1,811,991 granted to me on June 30, 1931; and that shown and described in my application for patent filed on Feb. 26, 1930, under Serial No. 431,361, for a machine for grading fruit and vegetables.

The present invention is for a combined machine for cleaning and grading both fruit and vegetables, such as apples, oranges, peaches, tomatoes, etc., and will operate on fruit and vegetables having very tender skin, such as peaches and some kinds of apples which it has been impossible heretofore to grade and clean with a machine, as their tender skin would become bruised and damaged by being put through a machine.

The object of the invention is to provide a machine that shall be simple of operation, positive in its action, comprise few parts and combine cheapness with durability of construction.

Another object of the invention is to provide a machine wherein the fruit is protected from damage during its entire passage through the machine.

Still another object being to provide means, whereby the excess dirt is first removed from the fruit; the fruit then cleaned, and finally graded as to size and delivered to the packages.

With these and other objects in view, my invention consists in certain novel construction and combination of parts as will hereinafter be fully described and claimed, and illustrated in the accompanying drawings which form a part hereof and in which like figures of reference refer to corresponding parts in all of the views, and it is understood that slight changes may be made without departing from the spirit of the invention.

In the drawings—

Figure 1 is a side elevation of the device, and showing some of the parts in section, or with parts removed to more fully illustrate the working parts thereof.

Figure 2 is a top plan view of the same, also with some of the parts removed therefrom.

Figure 3 is a cross sectional view of Figure 1 taken on the line A—A, to show the feed hopper and elevator.

Figure 4 is a cross sectional view of Figure 1 taken on the line B—B, to show a part of the cleaning unit and the drive means for the grader.

Figure 5 is a cross sectional view of Figure 1 taken on the line C—C, to illustrate the grader and delivery means.

Figure 6 is a partial view of the elevator, showing the cleaning apron forming a part thereof.

Figure 7 is an enlarged partial view of the cleaner showing the arrangement of the belts and rollers thereof.

Figure 8 is an enlarged partial view of the final cleaner for the grader, showing the supporting means for the belt.

Figure 9 is an enlarged detail view of a part of the receiving troughs, showing the method of padding the same.

Referring to the drawings—

The machine comprises the combination of several units as follows, a hopper or feeding unit, an elevator unit, a cleaning unit, a grading and final cleaning unit, and a receiving and packing unit, all of which are operated in proper timed relation with each other from a central power unit such as an electric motor or other suitable source of power.

While I have herein shown and described the machine as being constructed of metal and wood with the required other parts, it is understood that any suitable materials may be used, and that the size of the machine will be governed by the kind of material to be cleaned and this will also control the speeds required by the different parts or units.

The hopper or feed unit comprises a rectangular frame 10 mounted on the legs 11 and provided with an inclined bottom formed of the solid portion 12 having an opening 13 which is bridged by the half-round slats or rods 14; the bottom 12 and sides 10 being provided with padding 15; while the lower end is open and has the two guide boards 16 mounted therein to the sides 10 and bottom 12 with their ends extending slightly beyond the end. These guides forming a spout and also being padded as at 17.

Adjacent the lower or discharge end of the feed unit is mounted the elevator unit which comprises the two side members 18 parallel with each other and spaced apart and having journaled therein near the top and bottom the transverse shafts 19 and 20, which have secured there and within said sides 18 the rollers 21 and 22 which support two parallel endless conveyor belts 23 and 24, which have secured thereto in proper spaced relation, the steps or cleats 25, each of which being provided with a pad 26 detachably secured thereto so that the same may be removed for cleaning or renewed; the spacing between these belts 23 and 24 and between the belts and the sides 18 being for the purpose of allowing any loose dirt from the fruit to drop through as the fruit is carried upward, and the conveyor being so spaced with relation to the spout 16 that as the fruit passes through said spout 16 it will be deposited upon the traveling steps 25 of the conveyor where it is carried upward and delivered to the cleaning unit, which comprises the two spaced and parallel sides 27, within which are rotatably mounted the upper transverse shafts 28 and 29, and the lower transverse shafts 30 and 31, which carry the rollers 32, 33, 34 and 35, which are slightly crowned and upon which are mounted the endless belt conveyors 36 and 37, which are spaced apart and which travel in opposite directions, the driving means for which will be hereinafter described. It is to be understood that all of the endless belts on the machine may be supplied with suitable means for tightening the same such as adjustable bearing for the shafts.

The upper side of the conveyor unit from the top to within a short distance of the spout 16 is provided with an apron or cover 38 of material such as plush or carpet and rests upon the fruit that is being carried upward, and tends to brush the surface of the same as it is moved in contact therewith. The lower end of said conveyor unit is secured either to the feeder unit or to the floor and the upper end is attached to the cleaner unit which is supported upon the braces 39.

The cleaning belts 36 and 37 are covered with a suitable cleaning and polishing material such as carpet, plush, etc. 40, that provides a thick nap in contact with the fruit; the belt 36 being made to travel at a faster speed than the belt 37 to provide a polishing movement while the fruit is being carried forward by the belt 37. The cleaning unit may be attached to the upper end of the conveyor unit as described and to the grading unit by suitable means.

The grading unit comprises the two end frames 41 and 42 which are spaced apart and secured together by the braces or rods 43, and said frames 41 and 42 have journaled in their upper ends the two parallel shafts 44 and 45, upon which are mounted the stepped grading rollers 46 and 47, which are covered with a suitable material such as plush, felt, or carpet and which is formed with a spiral ridge 48 to convey the fruit, while said rollers 46 and 47 are spaced apart to allow the different sizes of fruit to pass between them as it reaches the proper width of opening between said rollers.

It is also to be noted that these rollers 46 and 47 are mounted in an inclined manner.

Referring to Figures 4 and 5 of the drawings; above the rollers 46 and 47 and secured to the frames 41 and 42 are the brackets 49 to which are secured the guide boards 50 which are connected together at their upper ends by the cross member 51, where the cleaner unit delivers the fruit from the belt 37, and they are open at the lower end and deliver the largest fruit directly upon its proper receiving tray.

As a final cleaning and polishing means, there is provided above said rollers 46 and 47, an endless belt 52 mounted upon the rollers 53 and 54 which are secured upon the transverse shafts 55 and 56 which are rotatably mounted in the boards 50 secured to the brackets 49; said belt 52 being covered with a soft polishing material such as carpet, felt, etc. 57, secured thereto in folds 58 to present a very soft contact with the fruit to polish, roll and steady the same; this belt having the same direction of travel as the fruit, and spaced the proper distance above said fruit to be at all times in contact therewith.

The belt 52 is supported upon the end rollers 53 and 54 which are slightly crowned, and may be provided with idler rollers therebetween for further support.

It is understood that the sides of the conveyor unit 18, the cleaner unit 27 and the polisher unit 50 are all provided with suitable padding 90 and from the time that the fruit is placed in the feeder 10 to the time it reaches the containers 81 it is always in contact with a padded surface.

Referring to Figure 8 the lower belt 37 of the cleaner unit is supported upon the end rollers which are flat or slightly crowned, and upon a series of idler rollers 36, which are slightly concave in form to impart to the belt a trough shape to induce the fruit to travel near the middle of the belt, and to further support this belt, strips 62 are secured to the sides 27 under the belt, and above the belt are placed the quarter round strips 63 to keep the fruit away from said sides.

Under the grading rollers 46 and 47 are securely mounted in the frames 41 and 42, the receiving trays which are placed on an incline and which are formed with a bottom (see Figure 9) 64 of some suitable material that is not too hard and which is covered with several layers of padding 65 and over the same is placed the canvas 66; said trays being divided into compartments corresponding to each size of fruit to be graded, by the partitions 67 which are also covered with padding 68 and canvas 69 before being attached to the bottom 64 by the screws 91; the ends 70 and back 71 are treated in the same manner with padding. The lower ends of said trays are partly closed by the fronts 72, while a strip of webbing 73 is secured at an angle to the side or partition 66 and to the front 72, and on the other side are secured the deflector plates 92 which are also padded.

The object of the deflector plate 92 and the webbing 73 being to retard the speed of travel of the fruit to protect the same from hard contact with each other.

Under said rollers 46 and 47, each tray is provided with a pad 74 covered with canvas or other suitable material which is secured to the back edge, the partitions 67 and to the bottom, to provide a very soft cushion for the fruit to fall upon from the grading rollers.

Each opening in the front of the receiving trays is provided with a gate or spout 77, which is formed of a bent wire 78, the ends of which are formed into eyes and hinged to the fronts 72 in such a manner that they may be turned upward to close the openings and secured by a catch, or opened on an incline to afford a spout to carry the fruit to the containers 81 which are placed upon the table or bench 80; the last tray being beyond the end of the rollers 46 and 47 being for the largest fruit which does not pass between said rollers, but which rolls off of the ends thereof directly into its proper tray.

The driving means for the machine may be either hand operated or by power, and is here shown as an electric motor 82 which is mounted upon a shelf 83 secured upon the cross member 84 which is pivoted at one end as at 85 to the frame 41, while its free end 86 is confined by the guard 87 secured to the leg of the frame in such a manner that while the weight of the motor 82 will keep the belts tight and in a driving position, they may be loosened to stop the machine by raising up on the free end 86 of the member 84.

Above the member 84 and forming a part of the frame 41 is a cross brace 88 to which are secured the bearings 89 within which are rotatably mounted the jack shaft 93, upon which is secured a compound pulley 94 which is driven from the motor 82 by the belt 95, and which in turn drives the pulley 96 attached to the shaft 45 by the belt 97, while the pulley 98 on the shaft 44 is driven by the belt 99 from the pulley 96 and in this manner the rollers 46 and 47 are rotated in opposite directions causing the fruit to be carried upward between them and not pinched as it would be if carried downward by the rollers.

The polishing unit is operated and its belt 52 driven by a pulley 100 secured upon the shaft 55 and driven by a belt 101 from a pulley 102 secured upon the shaft 93; while the lower belt 37 of the cleaner unit is driven by a pulley 103 secured upon the shaft 31 and driven by a belt 104 from the pulley 100, said belt 37 being used to drive or rotate the shaft 30, upon which is secured a pulley 105 which drives by the belt 106 the pulley 107 secured upon the shaft 28, and the pulley 108 secured upon the shaft 19 of the conveyor unit.

Having thus described my invention, what I claim as new and desire to secure by Letters Patent, is—

1. A combined cleaning and grading machine, comprising a feeding unit having means for rough cleaning, a conveyor mounted adjacent the same to receive and elevate the fruit, a cleaning unit mounted adjacent the upper end of said conveyor and comprising two spaced endless belts, one above the fruit and one below the fruit and in contact therewith and means for operating the same, a grading unit mounted adjacent the delivery of said cleaning unit, and a polishing means mounted above said grading unit and comprising an endless belt of polishing material to travel in contact with the fruit, a series of padded receiving trays mounted under said grading unit, each of said trays formed with an opening in the front thereof, a combined spout and door hinged to the front adjacent the opening to either close said opening or act as a delivery spout for the receiving trays.

2. A combined fruit cleaner and grading machine, comprising a feeding unit for receiving the fruit, an elevator unit mounted adjacent thereto to receive the fruit therefrom and convey the same upward, a cleaning unit mounted adjacent the upper end of said conveyor to receive the fruit therefrom and comprising, two spaced sides, transverse shafts rotatably mounted therein, rollers mounted thereon, an upper and a lower endless belt carried by said rollers and spaced apart, cleaning material secured to said belts in contact with the traveling fruit, means for supporting the lower belt and guiding the fruit to the center thereof, a grading unit adjacent said cleaning unit to receive the fruit therefrom grade and deliver said fruit and a polishing means mounted above said grading unit to polish the fruit as the same is graded.

GEORGE G. BATES.